United States Patent [19]
Jin et al.

[11] Patent Number: 5,737,704
[45] Date of Patent: Apr. 7, 1998

[54] CHANNEL ALLOCATION METHOD FOR REMOVING INTER-CELL HARD HANDOFFS IN A CDMA SYSTEM

[75] Inventors: Go-Whan Jin; Mou-Ho Cho; Cheol-Hye Cho; Hun Lee, all of Daejeon, Rep. of Korea

[73] Assignee: Electronics and Telecommunications Research Institute, Daejeon, Rep. of Korea

[21] Appl. No.: 683,967

[22] Filed: Jul. 22, 1996

[51] Int. Cl.$^6$ ................ H04Q 7/20; H04B 7/00
[52] U.S. Cl. ............. 455/450; 455/422; 455/517
[58] Field of Search .................. 455/33.1, 33.3, 455/33.4, 54.1, 56.1, 422, 450, 517, 524; 370/331, 332, 333, 334

[56] References Cited

U.S. PATENT DOCUMENTS

| | | | |
|---|---|---|---|
| 4,803,738 | 2/1989 | Ikeda | 455/33.1 |
| 5,448,751 | 9/1995 | Takenaka et al. | 455/33.1 |
| 5,459,759 | 10/1995 | Schilling | 455/33.1 |
| 5,551,060 | 8/1996 | Fujii et al. | 455/33.3 |

*Primary Examiner*—Reinhard J. Eisenzopf
*Assistant Examiner*—Sam Bhattacharya
*Attorney, Agent, or Firm*—Antonelli, Terry, Stout, & Kraus, LLP

[57] ABSTRACT

In a method for allocating channel for reducing hard handoff in CDMA system, which is divided all service area by a plurality of cells and allocates channel at each cell, cell is divided with a plurality of concentric circle regions, first region is allocated channel not allocated with a neighbor cell, third region is allocated channel allocated with a neighbor cell, and second region is allocated channel capable of allocating at both the neighbor cell and the cell. And, the first and second region is selectively varied in order to reduce handoff.

5 Claims, 2 Drawing Sheets

CHANNEL ALLOCATION METHOD FOR REMOVING INTER-CELL HARD HANDOFFS IN A CDMA SYSTEM

BACKGROUND OF THE INVENTION

1. Field of the Invention

The present invention relates to a method for allocating channels in a CDMA (Code Division Multiple Access) system, and particularly, to a method for allocating channels by dividing a cell into 3 regions using 2 RTDS (Round Trip Delay) in order to reduce a hard handoff in CDMA system.

2. Description of the Prior Art

In general, in a CDMA telecommunication system, different frequency bands are used between neighboring cells. When a mobile station passes through the boundary of a cell, the channel must be changed in order to provide line continuity. This is called a hard handoff. When an engaged mobile station goes through a handoff between cells with the same CDMA frequency, communications with a new base station start before completion of the communications with the current base station, so that an abrupt cut in communication is prevented. This is called a soft handoff.

The concept of a the handoff is described with reference to FIG. 1. Referring to FIG. 1, in a CDMA system, a cell construction is shown, with a radio channel allocated to a neighboring cell and a radio channel not allocated to a neighboring cell is allocated to an arbitrary cell.

That is F2 is only used in a neighboring cell and F1 and F2 can be used only in a center cell. A hard handoff occurs from F1 to F2 unless a special radio channel system is used.

In general, in a CDMA telecommuncation system, operation with a plurality of radio frequencies is required to conduct commercial business. Among the radio frequencies, a first frequency which does not exist in a neighboring cell may be allocated to the corresponding cell. At this time, since the channel of a cell is different from that of the neighboring cell, a hard handoff, that is, changing the radio channel between cells is required. However this is difficult because of a problem with technology.

Accordingly, conventionally one cell is divided into two regions by a concentric circle RTD (Round Trip Delay), and then a channel which is not allocated to a neighboring cell is allocated to the inside region of a cell and a channel which is allocated with a neighboring cell is allocated in the outside region of a cell and thereafter communications are conducted.

However, in the radio channel system in which the region of a cell is divided by one RTD, although a hard handoff does not occur between cells because the channels in the outside region of a cell and a neighboring cell are the same, when a mobile station frequently goes over the boundary of the inside region and the outside region of a cell, there is a problem of a substantial increase in hard handoffs occurring in.

SUMMARY OF THE INVENTION

An object of the present invention is to provide a method of allocating channel in CDMA system in which not only does a hard handoff between cells not occur but also a hard handoff in a cell is reduced and at the same time, the loss of communications probability is maintained below a fixed rate.

To achieve the object as mentioned above, the invention is a method for allocating channel in CDMA system which divides a service area into a plurality of cells and allocates a channel to each cell, the method comprising: a first step of dividing a cell into a plurality of concentric circle regions; a second step for allocating a first channel not allocated to a neighboring cell to an innermost concentric circle region of the cell; a third step of allocating a second channel allocated to the neighboring cell to the outermost concentric circle region of the cell; and a fourth step of allocating the first and second channels allocated by the second step and third step to a middle concentric cicle region of the cell region.

BRIEF DESCRIPTION OF THE DRAWINGS

Hereinafter, preferred embodiments of the present invention will be described with reference to the accompanying drawings.

DETAILED DESCRIPTION OF THE PREFERRED EMBODIMENTS

To begin with, in a radio channel operating system according to the present invention, there are three region allocation methods; (1), a two fixed RTD region, (2), one fixed RTD region and one variable RTD region and, (3), a two varible RTD region.

First, the two fixed RTD region allocation method will be described.

Figure 1:
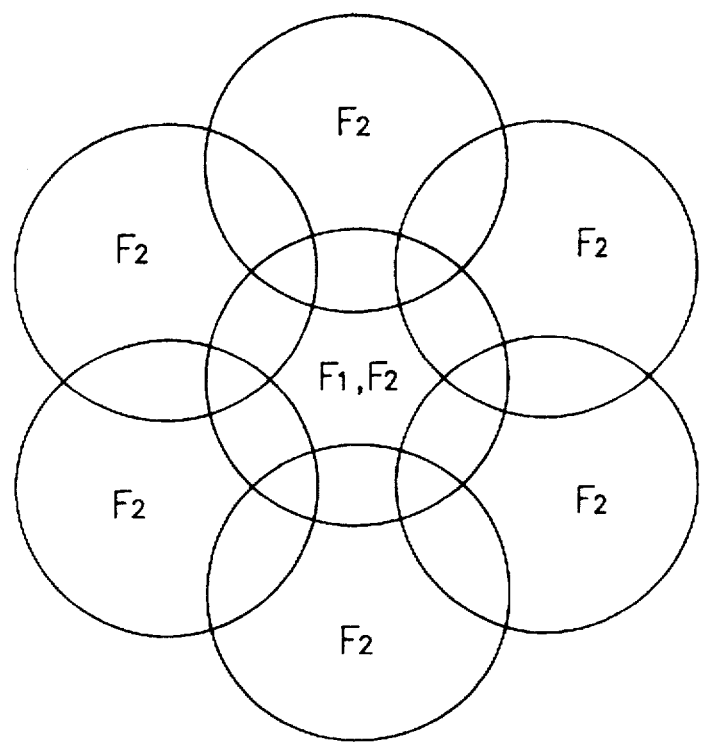
FIG. 1 is a view showing a cell construction environment in a CDMA (Code Division Multiple Access) system.
Figure 2:
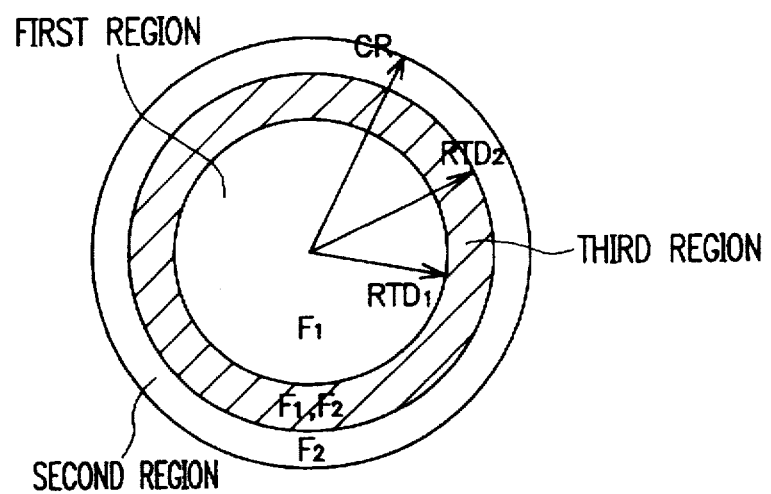
FIG. 2 is a view showing a method for allocating two fixed RTD region.

FIG. 2 is a view for showing a two fixed RTD region allocation method.

Referring to FIG. 2, RTD1 and RTD2 are boundaries for allocating a region of a cell and F1 (a first channel) is used only in a region from the center to RTD1 (a first region) in a cell, both the first channel F1 and F2 (a second channel) are used in a region from RTD1 to RTD2 (a third region) in a cell and the second channel F2 is used only in a region from RTD2 to CR (a second region), in a cell, where CR is the boundary of the cell.

In this method, a hard handoff between cells does not occur and only a soft handoff between cells occurs.

Four cases of hard handoffs are generated in the cell, two cases from F1 to F2, and the other two cases from F2 to F1.

In hard handoffs from F1 to F2, one case is that a call using F1 moves to a second region using only F2 from a third region using both F1 and F2, the other case is that a call moves to a second region using F2 via a third region using both F1 and F2 from a first region using only F1.

In hard handoffs from F2 to F1, one case is that a call using F2 moves to a first region using only F1 from a third region using both F1 and F2, the other case is that a call moves to a first region using only F1 via a third region using both F1 and F2 from a second region using only F2.

Since the third region provides buffering for a handoff, hard handoffs in a cell can be reduced compared to a one RTD region allocation method.

Second, a region allocation method having one fixed RTD region and one variable RTD region will be described.

Figure 3:
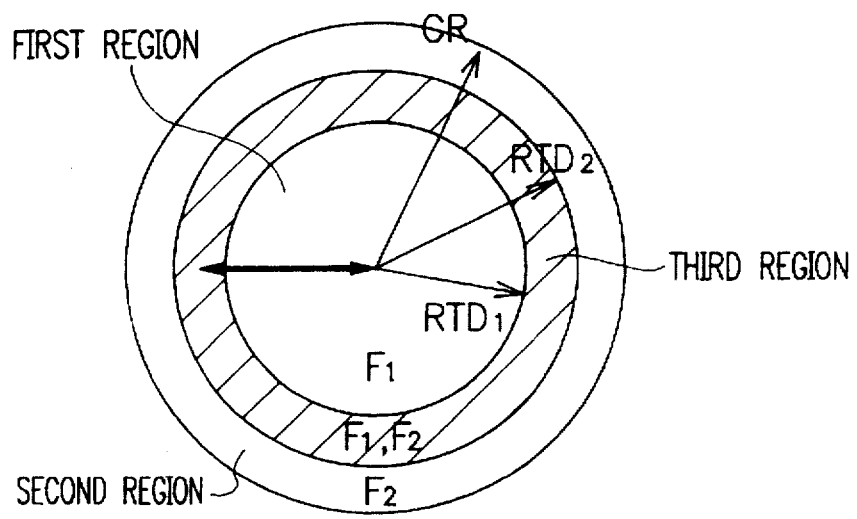
FIG. 3 is a view of showing a method for allocating one fixed RTD region and one varible RTD region.

FIG. 3 is a view for showing a region allocation method having one fixed RTD region and one variable RTD region.

Referring to FIG. 3, RTD2, as a boundary of a second region, using only F2, is fixed, RTD1, as a boundary of a first region, is varied in accordance with the number of engaged calls.

That is, when the number of calls using F1 is increasing, RTD1 is decreased, so that the first region becomes narrower. When the number of calls using F1 is decreasing, RTD1 is increased, so that the first region is becomes wider.

This method is the same as the two fixed RTD region allocation method, except for variable operation of one of the two RTD regions.

A hard handoff between cells does not occur as in the two fixed RTD region allocation method, and the variation of RTD1 causes the size of the third region using both F1 and F2 to vary, so that the generation of a hard handoff in a cell is substantially reduced compared with the two fixed RTD region allocation method.

Of course, the opposite case of RTD1 and RTD2 is possible and has the same characteristic as described above.

Third, the two variable RTD region allocation method is described.

Figure 4:
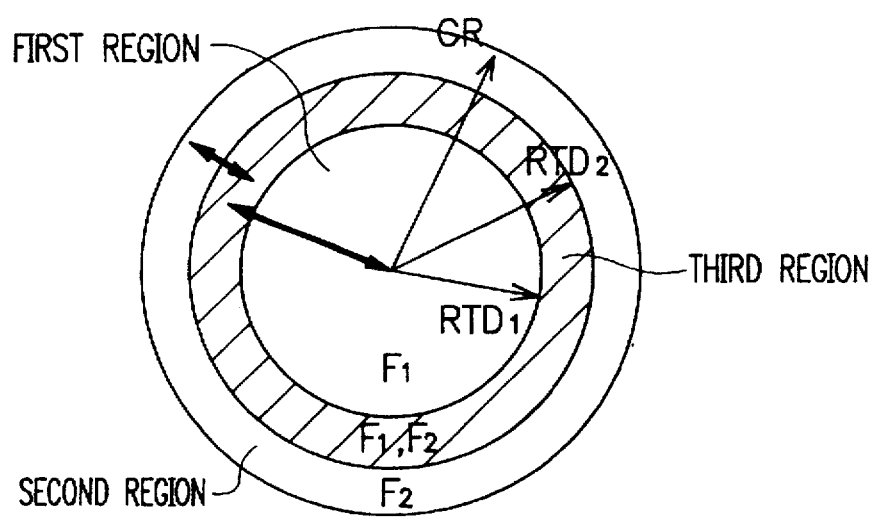
FIG. 4 is a view showing a method for allocating two varible RTD region.

FIG. 4 is a view showing a two variable RTD region allocation method.

Referring to FIG. 4, RTD1, determining a first region using only F1, is varied in accordance with the number of calls using F1 and RTD2, determining a second region using only F2, is varied in accordance with the number of calls using F2. That is, when the number of calls using F1 is increasing, RTD1 is decreased, so that the first region becomes narrower. When the number of calls using F1 is decreasing, RTD1 is increased, so that the first region becomes wider. When the number of calls using F2 is increasing, RTD2 is increased, so that the second region becomes narrower. When the number of calls using F2 is decreasing, RTD2 is decreased, so that the second region becomes wider.

This method is the same as the two fixed RTD region allocation method, except for a variable operation of the two RTD regions.

A hard handoff between cells does not occur with the two fixed RTD region allocation method, and the variation of RTD1 and RTD2 causes the size of third region using both F1 and F2 to vary softly, so that the generation of hard handoff in a cell and the loss probability of communications is substantially reduced compared with not only the two fixed RTD region allocation method but also the region allocation method having one fixed RTD region and one variable RTD region.

The comparison of the number of hard handoffs is as follows.

In the operation system of the radio channel of the two RTD region allocation method according to the present invention, the number of handoffs can be computed by the following method.

When the number of hard handoffs between cells is 0, if TD denotes a traffic intensity, CR denotes a radius of cell, and MV denotes a velocity of mobile station, the number of soft handoffs in between cells is π*TD*CR*MV.

In a case of a handoff from F1 to F2, when a call moves to a second region from a third region, the number of hard handoffs in a cell, is π*TD*RTD2*MV÷2; when the call moves to the second region via provisionally the third region from the first region, the number of hard handoffs in a cell is π*TD*RTD1*MV*PDI*PDU where the probability of moving from the first region to the second region denotes PDI and the probability of maintaining a call of handoff from the first region to the second region denotes PDU.

In the case of a handoff from F1 to F2, the number of hard handoffs in a cell is obtained by adding the number of hard handoffs from the third region to the second region and the number of hard handoffs from the first region to the second region via provisionally the third region.

That is, the number of hard handoffs in a cell in case of handoff from F1 to F2

$$=\pi{*}TD{*}RTD2{*}MV\div 2+\pi{*}TD{*}RTD1{*}MV{*}PDI{*}PDU$$

$$=\pi{*}TD{*}MV{*}(RTD2\div 2+RTD1{*}PDI{*}PDU)$$

In the case of handoffs from F1 to F2, the number of hard handoffs in a cell, when a call moves to a first region from a third region, is π*TD*RTD1*MV÷2; when the call moves to the first region via provisionally the third region from the second region, the number of hard handoffs in a cell is π*TD*RTD2*MV*PDI*PDU where the probability of moving from the second region to the first region denotes PDI and the probability of maintaining a call of handoff from the second region to the first region denotes PDU.

In the case of handoffs from F2 to F1, the number of hard handoffs in a cell is obtained by adding the number of hard handoffs from the third region to the first region and the number of hard handoffs from the second region to the first region via provisionally the third region.

That is, the number of hard handoffs in a cell in case of handoff from F2 to F1

$$=\pi{*}TD{*}RTD1{*}MV\div 2+\pi{*}TD{*}RTD2{*}MV{*}PDI{*}PDU$$

$$=\pi{*}TD{*}MV{*}(RTD1\div 2+RTD2{*}PDI{*}PDU)$$

In the case that one of RTD1 and RTD2 is variable or both are variable, the number of handoffs is obtained by the following method. That is, after the number of handoffs generated at each RTD boundary multiplies to the probability of existing each state, i.e., RTD boundaries, each multiplied value is added.

That is, the number of handoffs is obtained by a weighted average.

Now, in CDMA system according to the present invention using two RTDs, a comparison of the loss of communications probability in the three methods for reducing hard handoffs will be described.

In the two fixed RTD region allocation method, since F1 is only used at the first region (from the center of cell to RTD1), F2 is only used at the second region (from RTD2 to CR) and both F1 and F2 are used at the third region (from RTD1 to RTD2), after computing the traffic which have to receive in each radio channel, the loss of communications probability is obtained by an Erlang-B formula on the basis of the computed traffic and the number of code of radio channel which can be used in one channel.

In the region allocation method having one fixed RTD region and one variable RTD region, the loss of communications probability is obtained as follows. The arriving rate of a new call from F1 to F2 and a call from a handoff in accordance with the change of variable RTD of variable RTD1 and RTD2 are computed, a stable state probability of each state is computed on the basis of the arriving rate, the each stable probability is multiplied by the generation rate of the loss of communications probability and then each multipled value is added.

In the two variable RTD region allocation method, the loss of communications probability is obtained as follows. The arriving rate of a New call from F1 to F2 and a call from a handoff in accordance with the change of RTD1 and RTD2 are computed, a stable state probability of each state is computed on the basis of the arriving rate, the each stable probability is multiplied by the generation rate of the loss probability, and then each multiplied value is added.

Next, the generation rate of handoffs and the loss probability are compared in an example.

When a radius of cell is 3 Km, the total traffic which have to receive in cell is 20 Erlang, the maximum number of channel code which can be used in one radio channel is 10, an average moving velocity of a mobile station is 30 Km/h, and a duration of new call is 30 seconds, the result is table 1 below.

Fifth, in the two variable RTD operating system, the frequency of the occurrence of handoffs in cell is substantially reduced and the loss probability is also good.

Sixth, the oprating system must be selected by the considering the frequency of the occurrence of handoffs, the loss probability and the complexity of system embodiment, and it is desired to select among two fixed RTD operating system, the operating system of the region allocation method having one fixed RTD region and one variable RTD region and two variable RTD operating system.

As described above, acccording to the present invention, there are several effects that not only the occurence of hard handoffs between cells is prevented, but also the loss probability is maintained below a fixed rate. Particularly, the number of hard handoffs in a cell is reduced, so that the quality of communication is improved.

TABLE 1 the comparison result of the generation rate of handoffs and the loss probability

| DIVISION | NO RTD | 1 RTD | 2 RTD (2 FIXD) | 2 RTD (1 FIXED, 1 VARIABLE) | 2 RTD (2 VARIABLE) |
|---|---|---|---|---|---|
| HANDOFF | | | | | |
| HARD HANDOFF BETWEEN CELLS | 100 | 0 | 0 | 0 | 0 |
| SOFT HANDOFF BETWEEN CELLS | 100 | 200 | 200 | 200 | 200 |
| F1–F2 HANDOFF IN CELL | 0 | 141 | 83 | 24 | 24 |
| F1–F2 HANDOFF IN CELL | 0 | 141 | 89 | 93 | 92 |
| LOSS PROBABILITY | 16% | 21.3 | 21.3 | 23.6 | 21.1 | where, a predetermined value of each case is as follows.

One fixed RTD operating system: RTD1=2.12 Km

Two fixed RTD operating system: RTD1=1.5 Km, RTD2=2.6 Km

The operating system of the region allocation method having one fixed RTD region and one variable RTD region:
RTD1=1.78 Km, RTD2=2.77 Km (F1 code=0)
RTD1=1.64 Km, RTD2=2.77 Km (F1 code=1)
RTD1=1.50 Km, RTD2=2.77 Km (F1 code=2)
RTD1=1.34 Km, RTD2=2.77 Km (F1 code=3)
RTD1=1.16 Km, RTD2=2.77 Km (F1 code=4)
RTD1=0.95 Km, RTD2=2.77 Km (F1 code=5)
RTD1=0.67 Km, RTD2=2.77 Km (F1 code=6)
RTD1=0.00 Km, RTD2=2.77 Km (F1 code=7)

Two variable RTD operating system:
RTD1=1.78 Km (F1 code=0), RTD2=2.12 Km (F2 code=0)
RTD1=1.64 Km (F1 code=1), RTD2=2.22 Km (F2 code=1)
RTD1=1.50 Km (F1 code=2), RTD2=2.32 Km (F2 code=2)
RTD1=1.34 Km (F1 code=3), RTD2=2.42 Km (F2 code=3)
RTD1=1.16 Km (F1 code=4), RTD2=2.51 Km (F2 code=4)
RTD1=0.95 Km (F1 code=5), RTD2=2.60 Km (F2 code=5)
RTD1=0.67 Km (F1 code=6), RTD2=2.68 Km (F2 code=6)
RTD1=0.00 Km (F1 code=7), RTD2=2.77 Km (F2 code=7)

The analysis of the result is as follows,

First, RTD system is necessary for reducing hard handoffs between cells.

Second, in operating systems using RTD, the difference of loss probability is a little, but the difference of the frequency of the occurrence of handoffs is much.

Third, the system using two RTDs has a better result than the system using one RTD.

Fourth, in the operating system of the region allocation method having one fixed RTD region and one variable RTD region, the frequency of the occurrence of handoffs in cell is substantially reduced, but the loss probability is increased more or less.

What is claimed is:

1. A method of allocating channels to a mobile moving in and between a center cell and at least one neighboring cell to reduce or prevent hard handoffs requiring the mobile to be switched between channels when moving in or between cells to maintain call continuity in a CDMA system having a center cell divided into concentric regions and at least one neighboring cell with a first channel being assigned to a part of the center cell, a second channel being assigned to the at least one neighboring cell and a part of the center cell and each concentric region being assigned at least one of the first or second channels comprising:

dividing the center cell into three concentric regions;

allocating the first channel to an innermost concentric region;

allocating the second channel to an outermost concentric region;

allocating the first and second channels to a middle concentric region; and assigning the mobile at least one of the first and second channels allocated to a location of the mobile in the three concentric regions of the center cell and the at least one neighboring cell so as to reduce or prevent hard handoffs.

2. A method in accordance with claim 1 wherein:

the three concentric regions are fixed.

3. A method in accordance with claim 1 wherein:

a first boundary between the innermost concentric and middle concentric regions is variable and a second boundary between the middle concentric and the outermost concentric regions is fixed; and further comprising measuring a number of calls of the center cell using the first channel; and increasing the first boundary when the measured number of calls on the first channel decreases and decreasing the first boundary when the measured number of calls on the first channel increases.

4. A method in accordance with claim 1 wherein:

a first boundary between the innermost concentric and middle concentric regions is fixed and a second boundary between the middle concentric and the outermost concentric regions is variable; and further comprising measuring a number of calls of the center cell using the second channel; and decreasing the second boundary when the measured number of calls decreases and increasing the second boundary when the measured number of calls increases.

5. A method in accordance with claim 1 wherein:

a first boundary between the innermost concentric and middle concentric regions is variable and a second boundary between the middle concentric and outer concentric regions is variable; and further comprising measuring a number of calls of the center cell using the first channel and increasing the first boundary when the measured number of calls decreases and decreasing the first boundary when the measured number of calls increases; and measuring the number of calls of the center cell using the second channel and decreasing the second boundary when the measured number of calls decreases and increasing the second boundary when the number of calls increases.

* * * * *